(12) United States Patent
Centner

(10) Patent No.: US 8,362,394 B2
(45) Date of Patent: Jan. 29, 2013

(54) NECK FOR A ROBOTIC WELDING TORCH

(75) Inventor: Robert J. Centner, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1084 days.

(21) Appl. No.: 12/166,706

(22) Filed: Jul. 2, 2008

(65) Prior Publication Data

US 2009/0039066 A1 Feb. 12, 2009

Related U.S. Application Data

(60) Provisional application No. 60/964,263, filed on Aug. 10, 2007.

(51) Int. Cl.
*B23K 9/00* (2006.01)
*B23K 9/10* (2006.01)
(52) U.S. Cl. .................................. 219/136; 219/137.31
(58) Field of Classification Search .................. 219/136, 219/137.31, 137.44, 137.51, 138–144; 52/292, 52/296

See application file for complete search history.

(56) References Cited

U.S. PATENT DOCUMENTS

| | | | |
|---|---|---|---|
| 3,775,584 A | 11/1973 | Moerke | |
| 4,539,465 A * | 9/1985 | Bosna | 219/137.7 |
| 5,512,726 A | 4/1996 | Arantes et al. | |
| 6,495,798 B1 | 12/2002 | Enyedy | |
| 2002/0095892 A1 * | 7/2002 | Johnson | 52/295 |
| 2007/0215675 A1 * | 9/2007 | Barnes | 228/112.1 |

FOREIGN PATENT DOCUMENTS

| | | |
|---|---|---|
| JP | 62234601 | 10/1987 |
| JP | 04059179 | 2/1992 |
| JP | 2005205484 | 8/2005 |
| WO | 2008/025553 | 3/2008 |

OTHER PUBLICATIONS

Morehead T: "Automatic multiwire GMAW multiplies productivity doubling welding wires can more than double production line throughput" Welding Journal, American Welding Society, Miami, FL, US, vol. 82, No. 6, Jun. 1, 2003, pp. 40-43.
Office Action from the Canadian Intellectual Property Office in Canadian Application No. 2,694,986; dated Jul. 3, 2012.

* cited by examiner

*Primary Examiner* — Sang Paik
(74) *Attorney, Agent, or Firm* — Fildes & Outland, P.C.

(57) ABSTRACT

A neck for a welding torch includes a rigid, non-tubular, elongated member having opposite first and second ends. The first end is connectable to a rear portion of the welding torch. The second end is connectable to a welding tip portion of the welding torch. The member locates and holds the welding tip portion in a precisely given location, and does not communicate welding power, welding wire, shielding gas, or cooling water between the first and second ends.

20 Claims, 3 Drawing Sheets

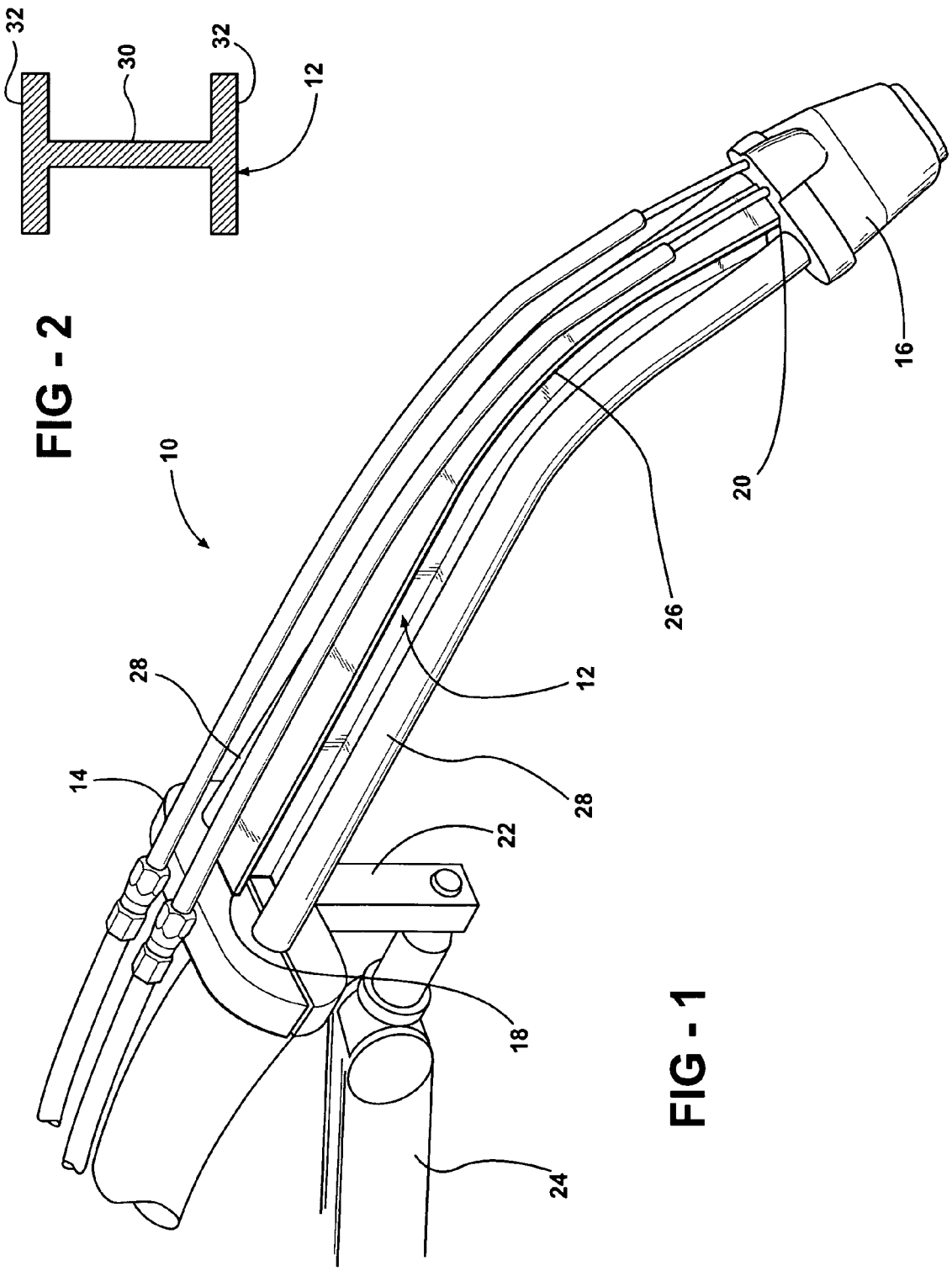

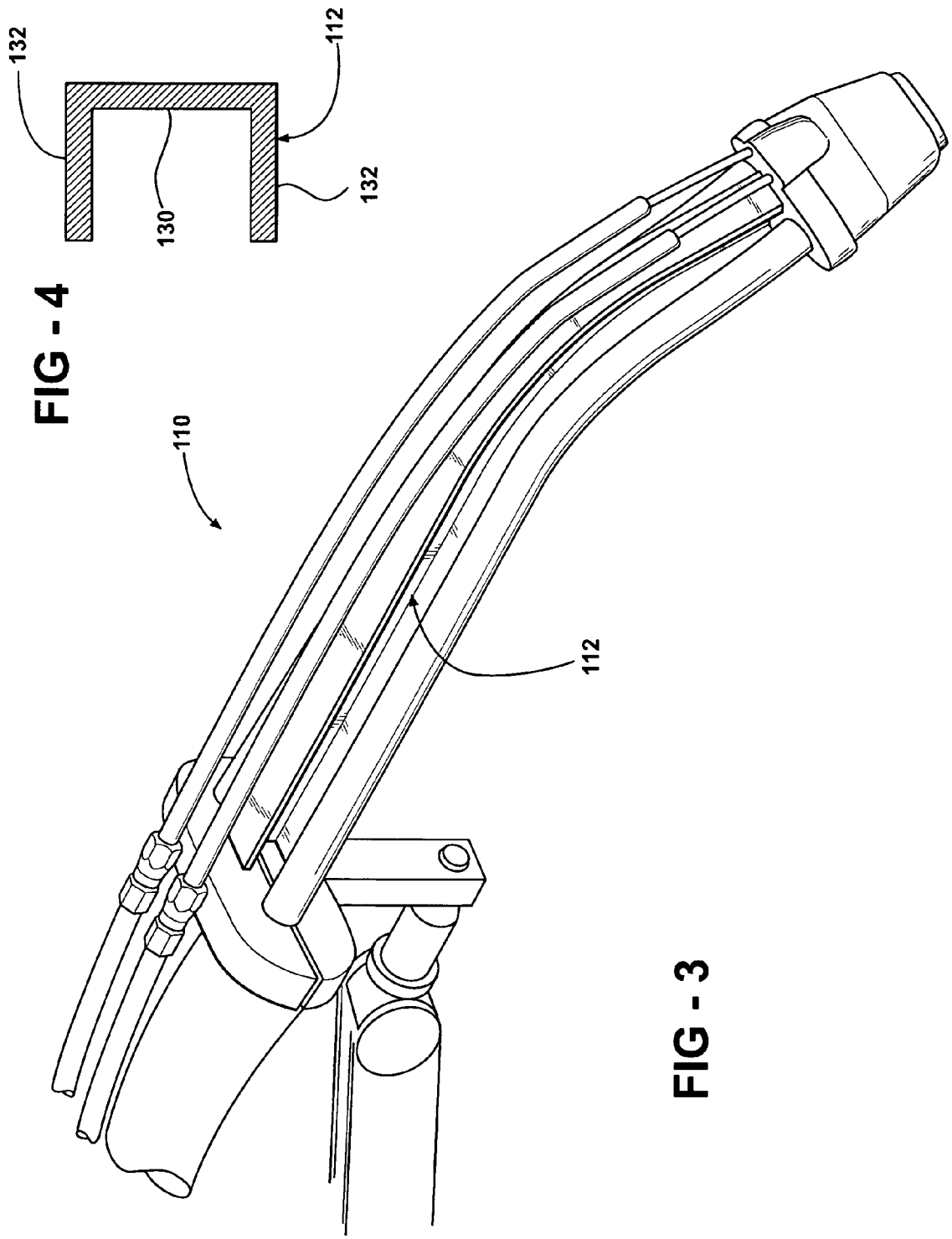

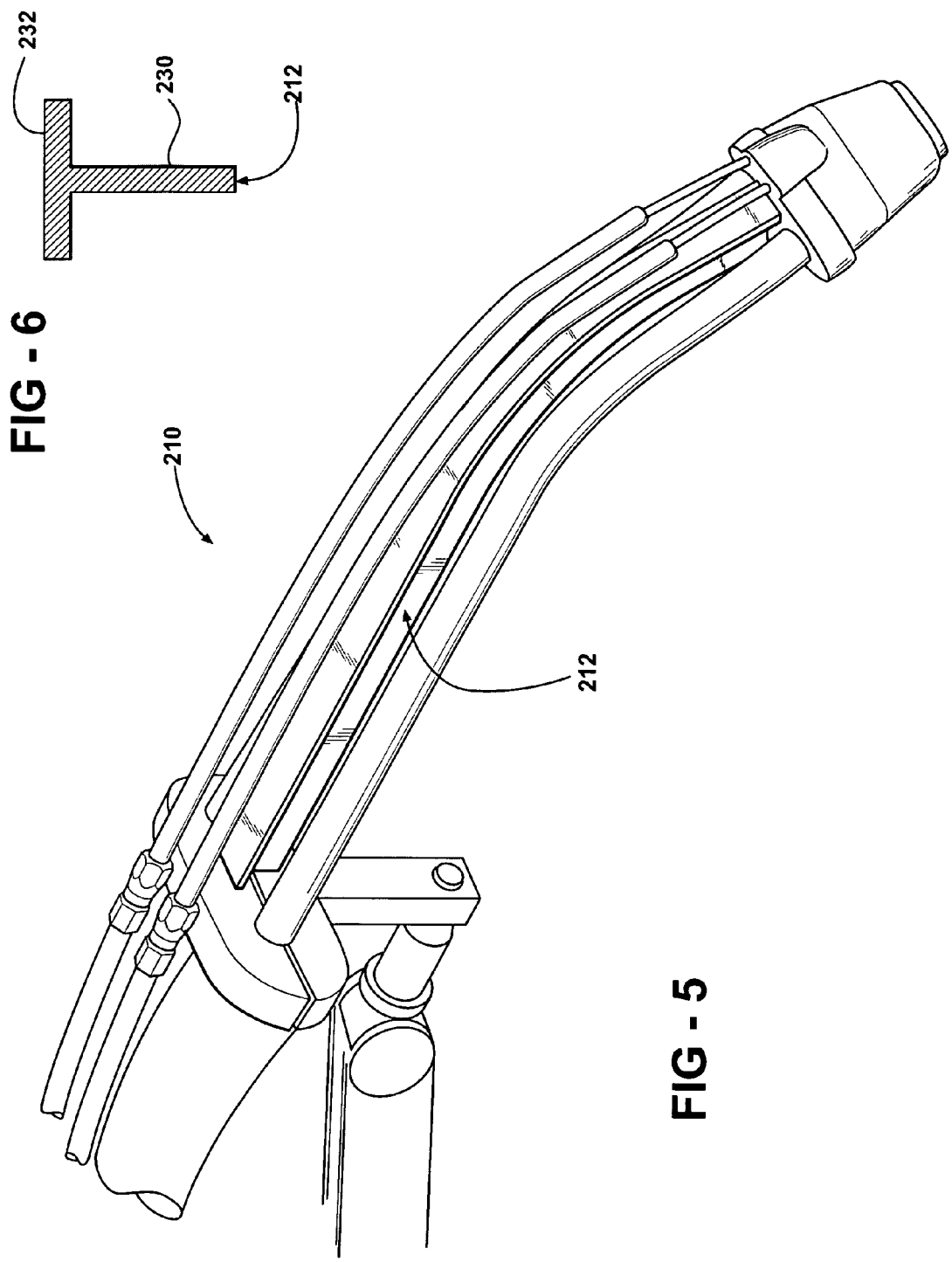

NECK FOR A ROBOTIC WELDING TORCH

CROSS REFERENCE TO RELATED APPLICATION

This application claims the priority of U.S. Provisional Application No. 60/964,263 filed Aug. 10, 2007.

TECHNICAL FIELD

This invention relates to welding torches mountable on a robot, and more particularly to a neck of a welding torch.

BACKGROUND OF THE INVENTION

It is known in the art relating to welding torches that welding torches generally include a flexible cable portion that delivers power, shielding gas, welding electrode, and sometimes cooling water to a tubular neck portion, which may be referred to as a gooseneck or swanneck. The neck portion delivers the power, shielding gas, welding electrode, and cooling water (if present) to a tip portion that is secured to an end of the neck portion. The tip portion may include a welding tip and a nozzle. Typically, a mounting arm that mounts the welding torch to a welding robot is attached to the welding torch at a point between the cable portion and the neck portion.

Accuracy is very important in robotic welding. The welding tip needs to be precisely and consistently located at a pre-determined three-dimensional point in space, measured from the welding robot's "face." This three-dimensional location, commonly referred to as the "tool center point" or "TCP" of the welding torch, is critical to a successful robotic welding operation. The mounting arm and neck portion are solely responsible for locating and maintaining the position of the welding tip with respect to the welding robot's face, and therefore should be manufactured with a high degree of precision.

Conventionally, the mounting arm includes precision machined aluminum or steel parts which when assembled are easily held to tight tolerances. These mounting arms are associated with a high degree of repeatability. The size and thickness of the parts of the mounting arm also make the mounting arms sturdy, which helps the mounting arms maintain the TCP. Further, it is not difficult to make any number of mounting arms to the exact (or nearly exact) same dimensions.

On the other hand, the neck portion is conventionally made of brass, copper, and/or aluminum tubular parts that are precision machined, but these parts are put through imprecise operations such as brazing and bending during assembly. This makes finished neck portions vulnerable to inconsistencies in length, bend location, and overall dimensions. Additionally, the lack of precision in the bending and/or brazing operations makes repeatability difficult in the manufacturing of the neck portions. Therefore, it is difficult to manufacture even two neck portions that have exactly the same dimensions. Further, due to the relatively small diameter and inherent softness of the materials from which the neck portion is made, the neck portion is not truly rigid. All of these factors combine to have a detrimental effect on both locating and maintaining the TCP. Hence, the neck portion is a weak link in maintaining a precise TCP.

Furthermore, after any bending operation, the neck portion is typically placed into a precision machined locating fixture by an operator and the TCP is checked for accuracy. In almost all cases, the TCP is not at the correct location, and the neck portion must be manipulated by hand to attempt to bring it within the tolerances for the TCP. This checking and manipulating of the neck portion's TCP is time consuming and does not always result in a neck portion having an acceptable TCP.

Also, it is common during a welding process that movement of the robot will cause the neck portion to accidentally hit a fixed object such as the workpiece being welded or a clamp/fixture that is holding the workpiece in place. Such a collision is referred to as a neck "crash." Often, a crash will result in bending of a conventional neck portion and subsequent misalignment of the TCP, requiring correction such as by the above-mentioned method.

SUMMARY OF THE INVENTION

The present invention provides a neck for a robotic welding torch that provides for precise and repeated location of the tool center point (TCP) of the welding torch. The welding torch is thereby capable of repeatedly performing accurate and successful welding operations.

More particularly, a neck for a welding torch in accordance with the invention includes a rigid, non-tubular, elongated member having opposite first and second ends. The first end is connectable to a rear portion of the welding torch. The second end is connectable to a welding tip portion of the welding torch. The member locates and holds the welding tip portion in a precisely given location, and does not communicate welding power, welding wire, shielding gas, or cooling water between the first and second ends.

The member may include at least one web and at least one flange connected to and disposed generally perpendicular to the web. The web and the flange may be elongated and generally may have the same length. In one embodiment, the member may have one web and two flanges that generally define an I-beam shape. In another embodiment, the member may have one web and two flanges that generally define a C-beam shape. In yet another embodiment, the member may have one web and one flange that generally define a T-beam shape.

The member may include a bend. The member may be manufactured by a precision computer numerical controlled machining process. The precisely given location may be a tool center point of the welding torch. A mounting arm may be connectable to the neck for mounting the welding torch on a robot.

A welding torch in accordance with the invention that is mountable on a robot includes a rear portion, a welding tip portion, and a neck having first and second opposite ends. The neck extends between the rear portion at the first end and the welding tip portion at the second end. The neck is a rigid, non-tubular, elongated member. The neck locates and holds the welding tip portion at a tool center point of the welding torch, and does not communicate welding power, welding wire, shielding gas, or cooling water between the rear portion and the welding tip portion.

The neck may include at least one web and at least one flange connected to and disposed generally perpendicular to the web. The web and the flange may be elongated and generally may have the same length. In one embodiment, the neck may have one web and two flanges that generally define an I-beam shape. In another embodiment, the neck may have one web and two flanges that generally define a C-beam shape. In yet another embodiment, the neck may have one web and one flange that generally define a T-beam shape.

The neck may include a bend. The neck may be manufactured by a precision computer numerical controlled machining process. A mounting arm may be connected to the neck for mounting the welding torch on a robot. The welding torch may further include a tubular assembly adjacent the neck for communicating at least one of welding power, welding wire, shielding gas, and cooling water between the rear portion and the welding tip portion.

These and other features and advantages of the invention will be more fully understood from the following detailed description of the invention taken together with the accompanying drawings.

BRIEF DESCRIPTION OF THE DRAWINGS

In the drawings:

FIG. 1 is a perspective view of a welding torch including a neck in accordance with the present invention;

FIG. 2 is a sectional view of the welding torch neck of FIG. 1;

FIG. 3 is a perspective view of an alternative embodiment of a welding torch including a neck in accordance with the present invention;

FIG. 4 is a sectional view of the welding torch neck of FIG. 3;

FIG. 5 is a perspective view of another alternative embodiment of a welding torch including a neck in accordance with the present invention; and FIG. 6 is a sectional view of the welding torch neck of FIG. 5.

DETAILED DESCRIPTION OF THE INVENTION

Referring now to the drawings in detail, numeral 10 generally indicates a welding torch in accordance with the invention. The welding torch 10 includes a neck 12 that has a precision machined structure that provides for precise and repeated location of a tool center point (TCP) of the welding torch. The precision machining of the neck results in the neck having more accurate dimensions and geometry in comparison to conventional necks. The neck 12 is also structurally stronger than conventional tubular necks, offering more support for a welding tip and nozzle during a welding operation. The neck 12 is also less likely to bend out of alignment due to inadvertent contact with other objects such as workpieces, fixtures, or similar.

With reference to FIGS. 1 and 2, the welding torch 10 includes a rear portion 14 such as a main housing or body. The rear portion 14 may connect the welding torch 10 to a flexible cable such as a unicable or similar welding cable assembly that carries welding electrode, shielding gas, and/or electrical current to the welding torch. Also, conduit may bring cooling water to and from the welding torch.

The welding torch 10 also includes a welding tip portion 16 at a front end of the torch. The welding tip portion 16 generally may include a nozzle and a welding tip, such as a contact tip or similar, out of which the welding electrode is fed during a welding operation. The nozzle may be water-cooled.

The neck 12 extends between the rear portion 14 of the welding torch 10 and the welding tip portion 16. The neck 12 has first and second opposite ends 18, 20. The first end 18 is connected to the rear portion 14 and the second end 20 is connected to the welding tip portion 16. A mounting arm 22 may be connected to the neck 12 for mounting the welding torch 10 on a robot 24.

The neck 12 may include a bend 26 or in the alternative may be generally straight. The neck 12 precisely locates the welding tip in an exact location with respect to the robot face, such as the TCP.

The neck 12 does not communicate any welding power (electrical current), consumable electrode (welding wire), shielding gas, or cooling water to the welding tip portion 16. Instead, these materials are delivered to the welding tip portion 16 by other tubular means such as an "air-cooled" MIG welding cable, water-cooled copper or brass tubular assemblies 28, or similar that are disposed along a side(s) of the neck 12. The assemblies 28 are connected to the rear portion 14 and to the welding tip portion 16.

The neck 12 may be manufactured, for example, by precision computer numerical controlled ("CNC") machining. One suitable precision CNC machining process is milling. The neck is also manufactured without any forming operations such as bending or brazing operations on components critical to locating the TCP such as the bend 26.

The neck 12 is a rigid, non-tubular, elongated member. The neck 12 may include at least one web 30 and at least one flange 32 connected to and disposed generally perpendicular to the web. The web(s) 30 and the flange(s) 32 may be elongated and generally may have the same length. In a specific embodiment shown in FIGS. 1 and 2, the neck may have one web 30 and two flanges 32 that generally define an I-beam having an I-shaped cross-section and C-channels on either side of the web. Alternatively, two opposed C-shaped beams (each having a web and two flanges) may be joined back-to-back to establish an I-beam.

In another embodiment 110 shown in FIGS. 3 and 4, the neck 112 may have one web 130 and two flanges 132 that generally define a C-beam having a C-shaped cross-section (i.e., a C-channel). The embodiment 110 may otherwise have similar features to the embodiment 10 of the welding torch.

In yet another embodiment 210 shown in FIGS. 5 and 6, the neck 212 may have one web 230 and one flange 232 that generally define a T-beam having a T-shaped cross-section. The embodiment 210 may otherwise have similar features to the embodiment 10 of the welding torch.

The illustrated embodiments of the neck 12, 112, 212 are shown in a twin wire/tandem robotic MIG welding torch, however the present invention is not limited to such torches. For example, the present invention is also applicable to single wire robotic MIG welding torches and to any other welding torch having a neck that locates a welding tip at a specific point such as the TCP.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A neck for a welding torch that also includes a torch tip portion and torch main body portion that supplies welding power, welding wire, shielding gas and/or cooling water, said neck comprising:

a rigid, non-tubular, elongated member having opposite first and second ends;

said first end being connectable to the torch main body portion;

said second end being connectable to the torch tip portion;

said rigid, non-tubular member extending completely between the torch main body portion and the torch tip portion;

wherein said member locates and holds said torch tip portion in a precisely given location, and welding power, welding wire, shielding gas, and/or cooling water are communicated adjacent said member between said torch main body portion and said torch tip portion.

2. The neck of claim 1, wherein said member includes:
   at least one web; and
   at least one flange connected to and disposed generally perpendicular to said web.

3. The neck of claim 2, wherein said member has one web and two flanges that generally define an I-beam shape.

4. The neck of claim 2, wherein said member has one web and two flanges that generally define a C-beam shape.

5. The neck of claim 2, wherein said member has one web and one flange that generally define a T-beam shape.

6. The neck of claim 2, wherein said web and said flange are elongated and generally have the same length.

7. The neck of claim 1, wherein said member includes a bend.

8. The neck of claim 1, wherein said member is manufactured by a precision computer numerical controlled machining process.

9. The neck of claim 1, wherein said precisely given location is a tool center point of the welding torch.

10. The neck of claim 1, wherein a mounting arm is connectable to said neck for mounting the welding torch on a robot.

11. A welding torch mountable on a robot, said welding torch comprising:
    a torch main body portion that supplies welding power, welding wire, shielding gas and/or cooling water;
    a torch tip portion; and
    a neck having first and second opposite ends, said neck extending completely between said torch main body portion at said first end and said torch tip portion at said second end;
    said neck being a rigid, non-tubular, elongated member;
    wherein said neck locates and holds said torch tip portion at a tool center point of said welding torch, and welding power, welding wire, shielding gas, and/or cooling water are communicated adjacent said neck between said torch main body portion and said torch tip portion.

12. The welding torch of claim 11, wherein said neck includes:
    at least one web; and
    at least one flange connected to and disposed generally perpendicular to said web.

13. The welding torch of claim 12, wherein said neck has one web and two flanges that generally define an I-beam shape.

14. The welding torch of claim 12, wherein said neck has one web and two flanges that generally define a C-beam shape.

15. The welding torch of claim 12, wherein said neck has one web and one flange that generally define a T-beam shape.

16. The welding torch of claim 12, wherein said web and said flange are elongated and generally have the same length.

17. The welding torch of claim 11, wherein said neck includes a bend.

18. The welding torch of claim 11, wherein said neck is manufactured by a precision computer numerical controlled machining process.

19. The welding torch of claim 11, including a mounting arm is connected to said neck for mounting the welding torch on a robot.

20. The welding torch of claim 11, including a tubular assembly adjacent said neck for communicating at least one of welding power, welding wire, shielding gas, and cooling water between said rear portion and said welding tip portion.

* * * * *